(12) United States Patent
Kidger

(10) Patent No.: US 9,600,986 B2
(45) Date of Patent: Mar. 21, 2017

(54) SIGNALLING SYSTEM

(71) Applicant: Cambium Networks Limited, Devon (GB)

(72) Inventor: Alexander Kidger, Devon (GB)

(73) Assignee: CAMBIUM NETWORKS LIMITED, Ashburton (GB)

( * ) Notice: Subject to any disclaimer, the term of this patent is extended or adjusted under 35 U.S.C. 154(b) by 0 days.

(21) Appl. No.: 14/749,394

(22) Filed: Jun. 24, 2015

(65) Prior Publication Data

US 2015/0317886 A1 Nov. 5, 2015

Related U.S. Application Data

(63) Continuation of application No. PCT/EP2013/077372, filed on Dec. 19, 2013.

(30) Foreign Application Priority Data

Dec. 24, 2012 (GB) .................................. 1223359.9

(51) Int. Cl.
*G08B 9/00* (2006.01)
*G08B 7/06* (2006.01)
(Continued)

(52) U.S. Cl.
CPC ............... *G08B 7/06* (2013.01); *H01F 27/24* (2013.01); *H01F 27/2823* (2013.01);
(Continued)

(58) Field of Classification Search
CPC combination set(s) only.
See application file for complete search history.

(56) References Cited

U.S. PATENT DOCUMENTS

| 911,774 A | 2/1909 | Stone |
| 1,173,655 A * | 2/1916 | Fay ........................... H04L 5/20 370/200 |

(Continued)

FOREIGN PATENT DOCUMENTS

| EP | 0 865 047 A1 | 9/1998 | |
| EP | 0865047 A1 * | 9/1998 | ......... H01F 17/0006 |

(Continued)

OTHER PUBLICATIONS

AT&T, "Principles of Electricity Applied to Telephone and Telegraph Work", Jan. 1953 (Section 17.4) (14 pgs).
(Continued)

*Primary Examiner* — Travis Hunnings
(74) *Attorney, Agent, or Firm* — Brinks Gilson & Lione

(57) ABSTRACT

A signalling system comprises a first data signal source (10, 14), a first data signal receiver (12, 16) and a cable 18 comprising two or more wire pairs ({1,2}, {3,6}, {4,5}, {7,8}) coupling the first data signal source to the first data signal receiver. A portion of each wire pair is wound around a magnetic core (28). A further winding (30) is wound around the core (28). A further signal source (24) is coupled to the further winding (30) and a further receiver (36, 26) is coupled to the wires to receive the further signal. The windings around the core apply the further signal to the wire pairs as a common-mode signal. This allows the further signal to be transmitted to the further receiver without affecting the signal transmitted between the source (10, 14) and the receiver (12, 16) and with only minor modification of the cable (18).

21 Claims, 5 Drawing Sheets

(51) Int. Cl.
- *H01F 27/24* (2006.01)
- *H01F 27/28* (2006.01)
- *H04L 5/20* (2006.01)
- *H04B 3/00* (2006.01)
- *H04B 3/30* (2006.01)
- *H04B 14/02* (2006.01)
- *H04L 25/02* (2006.01)

(52) U.S. Cl.
CPC .............. *H04B 3/00* (2013.01); *H04B 3/30* (2013.01); *H04B 14/02* (2013.01); *H04L 5/20* (2013.01); *H04L 25/0266* (2013.01); *H04L 25/0276* (2013.01)

(56) References Cited

U.S. PATENT DOCUMENTS

| | | | | |
|---|---|---|---|---|
| 2006/0115008 A1* | 6/2006 | Standish | .................. | H04B 3/02 375/257 |
| 2006/0159186 A1* | 7/2006 | King | .................. | H04L 5/20 375/258 |
| 2008/0025287 A1* | 1/2008 | Whittaker | ............. | H04J 3/0658 370/350 |
| 2008/0253556 A1* | 10/2008 | Cobb | .................... | H04Q 1/136 379/442 |
| 2012/0068830 A1* | 3/2012 | Caveney | ............ | H01R 13/6683 340/10.2 |

FOREIGN PATENT DOCUMENTS

| | | |
|---|---|---|
| GB | 2315392 A | 1/1998 |
| WO | WO 2006/075247 A1 | 7/2006 |

OTHER PUBLICATIONS

Gabara T: "Phantom mode signaling in VLSI systems", Advanced Research in VLSI, 2001. ARVLSI 2001. Proceedings. 2001 Conference on Mar. 14-16, 2001, Piscataway, NJ, USA, IEEE, Mar. 14, 2001 (Mar. 14, 2001), pp. 88-100, XP010538448, ISBN: 978-0-7695-1038-5.

International Search Report and Written Opinion issued in PCT/EP2013/077372 on Mar. 7, 2014 (12 pgs).

* cited by examiner

SIGNALLING SYSTEM

This is a continuation of International Application PCT/ 2013/077372, with an international filing date of Dec. 19, 2013, and which claims priority to GB application no 1223359.9, filed Dec. 24, 2012. Both applications are incorporated herein by reference in their entirety.

TECHNICAL FIELD

The present invention relates to a signalling system.

BACKGROUND

A known signalling system transmits signals over a cable containing a plurality of wire pairs. An example of such a system is an Ethernet system. Such a signalling system is known for use in for transmitting data over a cable from the bottom of a communications mast to radio equipment at the top of the mast.

SUMMARY

In accordance with one aspect of the present invention, there is provided a signalling system comprising:

a first signal source and a first signal receiver;

at least two wire pairs, one of the pairs coupling the first signal source to the first signal receiver;

a magnetic core arrangement around which a portion of each wire of the two pairs is wound;

a further signal source;

one or more further windings, coupled to the further signal source, each wound around the magnetic core arrangement, and electrically isolated from each wire of the two pairs;

wherein the windings are arranged so the further signal in each wire pair is a common-mode signal; and a further receiver coupled to receive the further signal by a coupling arrangement which is coupled to one of the wire pairs to receive the further signal and coupled to the other of the wire pairs to provide a return path for current induced in the wire pairs by the further winding.

This allows an additional signal to be coupled to a signalling system without significantly affecting the first signal and without adding additional wiring. In an embodiment the wiring may be wound around the core arrangement without breaking or otherwise interrupting the wiring. The inductive coupling provided by the core arrangement and the windings wound around it provide electrical isolation of the cable from the further signal source.

The system of the present invention may be used for transmitting data and the further signal over a cable from the bottom of a communications mast to radio equipment at the top of the mast, but the invention is not limited to that application of the invention.

In an example of the system, the core arrangement comprises a single magnetic core around which a portion of each of the wires is wound, and the further signal source is coupled to the magnetic core by said further winding.

In accordance with another aspect of the present invention, there is provided a method of modifying a signalling system the signalling system comprising a first data signal source and a first data signal receiver and at least two wire pairs, one of the pairs coupling the first data signal source to the first data signal receiver;

the method comprising providing a magnetic core arrangement;

winding a portion of each wire of the two pairs around the core arrangement, and providing a further signal source coupled to the wire pairs by one or more further windings wound around the core arrangement such that the one or more further windings are electrically isolated from each wire of the two pairs, wherein the windings are arranged so the further signal in each wire pair is a common-mode signal;

the system also having a further receiver coupled to receive the further signal by a coupling arrangement which is coupled to one of the wire pairs to receive the further signal and coupled to the other of the wire pairs to provide a return path for current induced in the wire pairs by the further winding.

In an example of the method, the core arrangement comprises a single magnetic core around which a portion of each of the wires is wound, and the further signal source is coupled to the magnetic core by a said further winding.

The method allows a further signalling system to be added to a pre-existing system without interrupting the continuity of pre-existing wiring.

In accordance with yet another aspect of the present invention, there is provided a signalling system comprising: a first data signal source and a first data signal receiver; and at least two wire pairs, one of the pairs coupling the first data signal source to the first data signal receiver; wherein the system is modified by the addition of a magnetic core arrangement around which a portion of each wire of the two pairs is wound, a further winding around the core arrangement, the further winding and the wires of the two pairs being electrically isolated from each other, and a further signal source coupled to the further winding, wherein the windings are arranged so the further signal in each wire pair is a common-mode signal; the system also having a further receiver coupled to receive the further signal by a coupling arrangement which is coupled to one of the wire pairs to receive the further signal and coupled to the other of the wire pairs to provide a return path for current induced in the wire pairs by the further winding.

Further features and advantages of the invention will become apparent from the following description of preferred embodiments of the invention, given by way of example only, which is made with reference to the accompanying drawings.

DETAILED DESCRIPTION

FIG. 1 Background

An embodiment of the invention will be described by way of example with reference to an Ethernet link, but the invention is not limited to Ethernet links.

Figure 1:
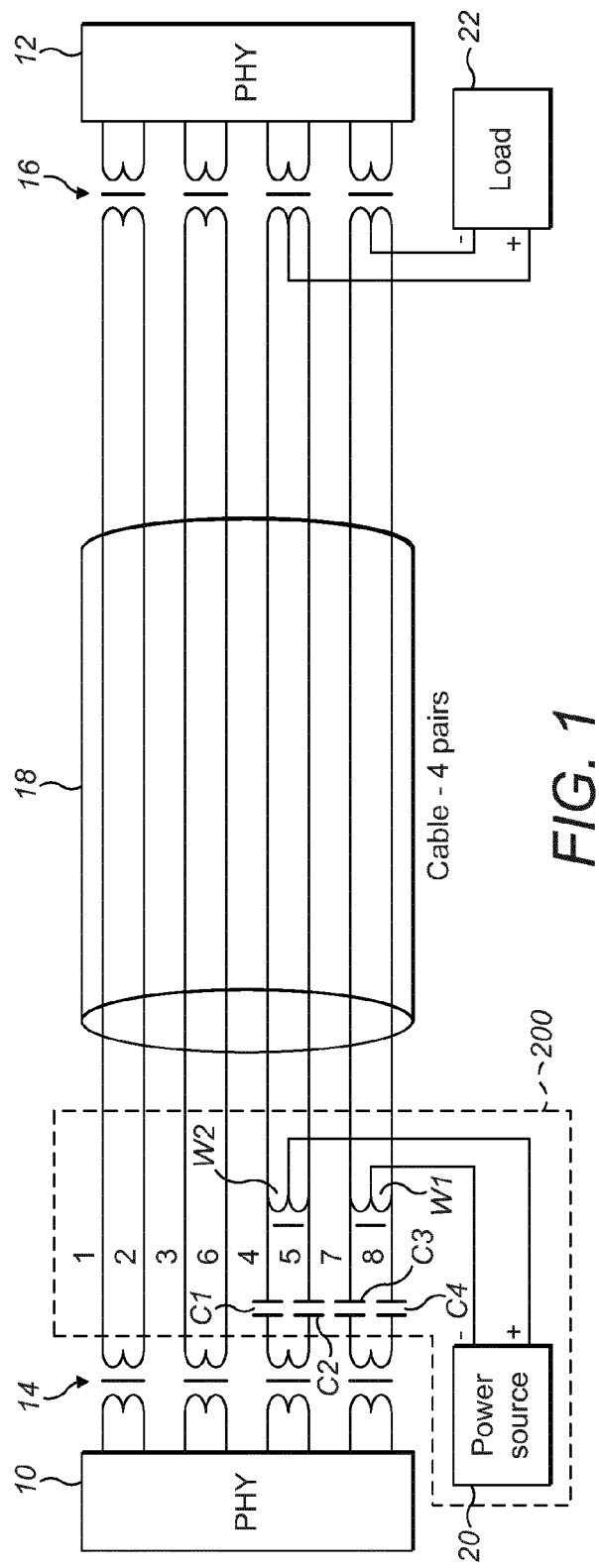
FIG. 1 is a schematic circuit diagram of a known Ethernet link with power provided over the link.

FIG. 1 shows by way of background a known Ethernet link with power provided over the link. In the link, two interface devices 10 and 12 ("PHY" or Physical layer devices) are coupled via quadruple transformers 14 and 16 and a 4-pair cable 18. In FIG. 1, the cable conductors are numbered according to the conventional scheme, such that the 4 pairs are labelled {1,4}, {3,6}, {4,5} and {7,8}.

In 1000BaseT (4-pair) Ethernet systems, each of the four pairs carries data in both directions simultaneously. The PHYs 10 and 12 would each contain 4 transceivers TR1-TR4 and TR11-TR14, one per cable pair. Power may be carried on any or no wire pairs.

In a 100BaseT Ethernet system, a cable having four pairs is typically used but Ethernet signals are carried on only two pairs, one of which signals in one direction and the other signals in the opposite direction. The other two pairs may be used only for power or not used for any purpose.

According to IEEE standard 802.3at-2009 and similar proprietary schemes, DC power may be carried on the same cable. There are several alternative wiring schemes. In one common example DC power is applied by a source 20 to one end of the cable via the centre-taps of two of the transformers. Thus two wire pairs carry current and in each wire pair the current is carried equally on the two wires of the pair. No (or very little) magnetic flux is generated in the transformer cores as a result. Likewise DC power is taken from the centre taps of corresponding ones of the transformers 16 at the other end of the cable and supplied to a load 22. Consequently data transfer is unimpeded by the addition of the DC power. FIG. 1 shows wire pairs {4, 5} and {7,8} used for power transfer, but pairs {1,2} and {3,6} could be used instead.

Figure 2:
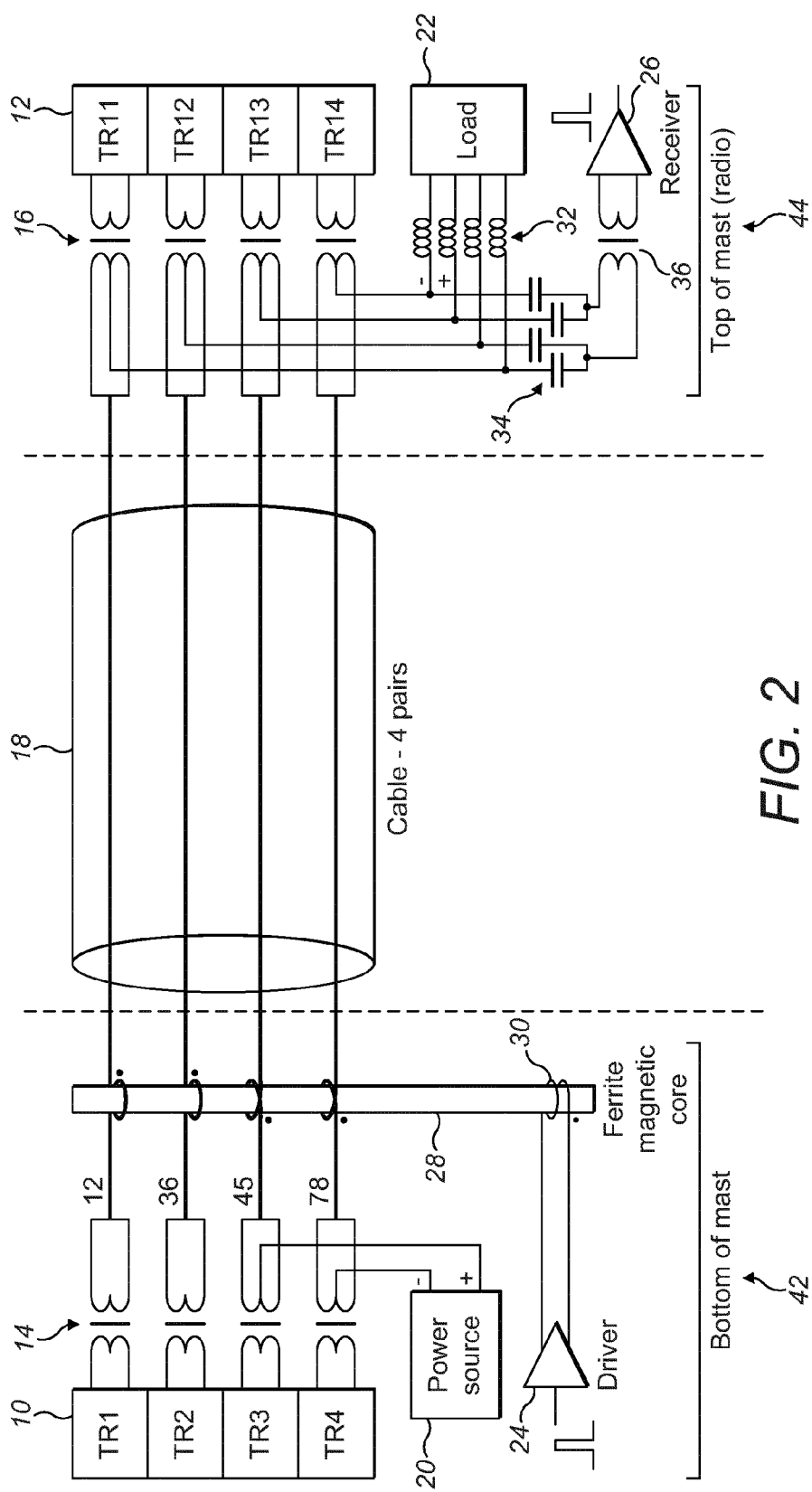
FIG. 2 is a schematic circuit diagram of a signalling system according to an embodiment of the present invention.

FIG. 2 A Signalling System According to an Embodiment of the Present Invention.

The embodiment of FIG. 2 modifies the system of FIG. 1. The PHYs 10 and 12 comprise transceivers TR1-TR4 and TR11-TR14. The system of FIG. 2 allows signals additional to the Ethernet data streams to be sent from sending equipment 42 including a sender 24 at the power source end of the cable to a receiving equipment 44 including a receiver 26 at the other end of the cable without affecting or changing the Ethernet data stream and without providing additional cabling. The signals may be digital data, or in this example synchronizing pulses, or both. The purpose of the synchronizing pulses will be described by way of example with reference to FIG. 4.

In FIG. 2, the two wires in each pair are drawn as one thicker line for clarity. In addition, the load 22 has been wired to include cases where power is applied to wire pairs {1,2} and {3,6} although that is not essential to the invention.

At the power sourcing end (the sender end) 42 each of the four wire pairs of the cable 18 is wrapped around a common ferrite magnetic core 28 which is shown for simplicity as a linear rod but in practice would be a closed loop as is conventional in transformers. Wire pairs {1,2} and {3,6} are wound in one direction whilst wire pairs {4,5} and {7,8} are wound in the opposite direction, as shown (and as further amplified by polarity dots) in the Figure.

A fifth winding 30 is wound round the ferrite magnetic core 28, wired to the sender 24 which comprises a suitable driver device. A standard commercial driver IC such as is used for RS422 or RS485 transmission is suitable.

The core 28 and the windings on it form an isolating transformer in which the windings are electrically isolated from each other.

By this means, a signal, in this example a synchronizing pulse or digital data, driven by the driver IC, is impressed upon the cable such that wire pairs {1,2}+{3,6} are driven with one polarity, whilst wire pairs {4,5}+{7,8} are driven with the opposite polarity.

It is to be noted that from the perspective of the Ethernet data carried on any one pair, the impressed pulse is carried as common-mode, that is, affecting each wire in the pair equally, and such that no (or very little) net magnetic flux is developed as a differential signal in the Ethernet coupling transformer 14 and transformer 16, and the Ethernet data is substantially unaffected.

At the receiver end the centre taps of the Ethernet transformer 16 are connected to the power load 22 via individual inductors 32 such that the DC power may still pass, but AC signals impressed on the cable are not significantly loaded. Coupling capacitors 34 connect these same centre taps via a signal transformer 36 to the receiver 26 (which may be a standard commercial device used for RS422 or RS485 communication) and provide a return path for the current induced in the wires of the cable 18 by the winding 30 and ferrite core 28. In FIG. 2, wire pairs {1,2} and {3,6} are one arm of the current loop and wire pairs {4,5} and {7,8} are the other arm of the loop, the arms being connected via the capacitors 34 and the primary winding of the transformer 36. The synchronizing pulse impressed on the cable 18 at the sender end of the cable is coupled via the signal transformer 36 to the receiver 26, such that the pulse is received and replicated at the receiver 26.

The same pulse polarity is applied to wire pairs {4,5} and {7,8} carrying the DC power such that the impressed pulse affects each pair equally. This means firstly, there is very little interference to the power delivered, and secondly that noise in the power delivery system is largely self-cancelled and attenuated from the perspective of the pulse receiver circuit. The same applies if power is delivered on the {1,2} and {3,6} wire pairs, as discussed earlier. It is possible to use all 4 wire pairs to deliver DC power to the load 22, and the same benefit applies thereto.

The coupling to the cable is shown as via inductive coupling 28, 30 (using the ferrite magnetic core 28) at the sender end, and via capacitive coupling (using the 4 capacitors 34 shown) at the receiver end. The two methods are interchangeable.

In one embodiment, there are inductive couplings 28, 30 at both ends of the signalling system.

The sender 24 and receiver 26 may be replaced by bi-directional transceivers to signal in both directions.

Figure 3:
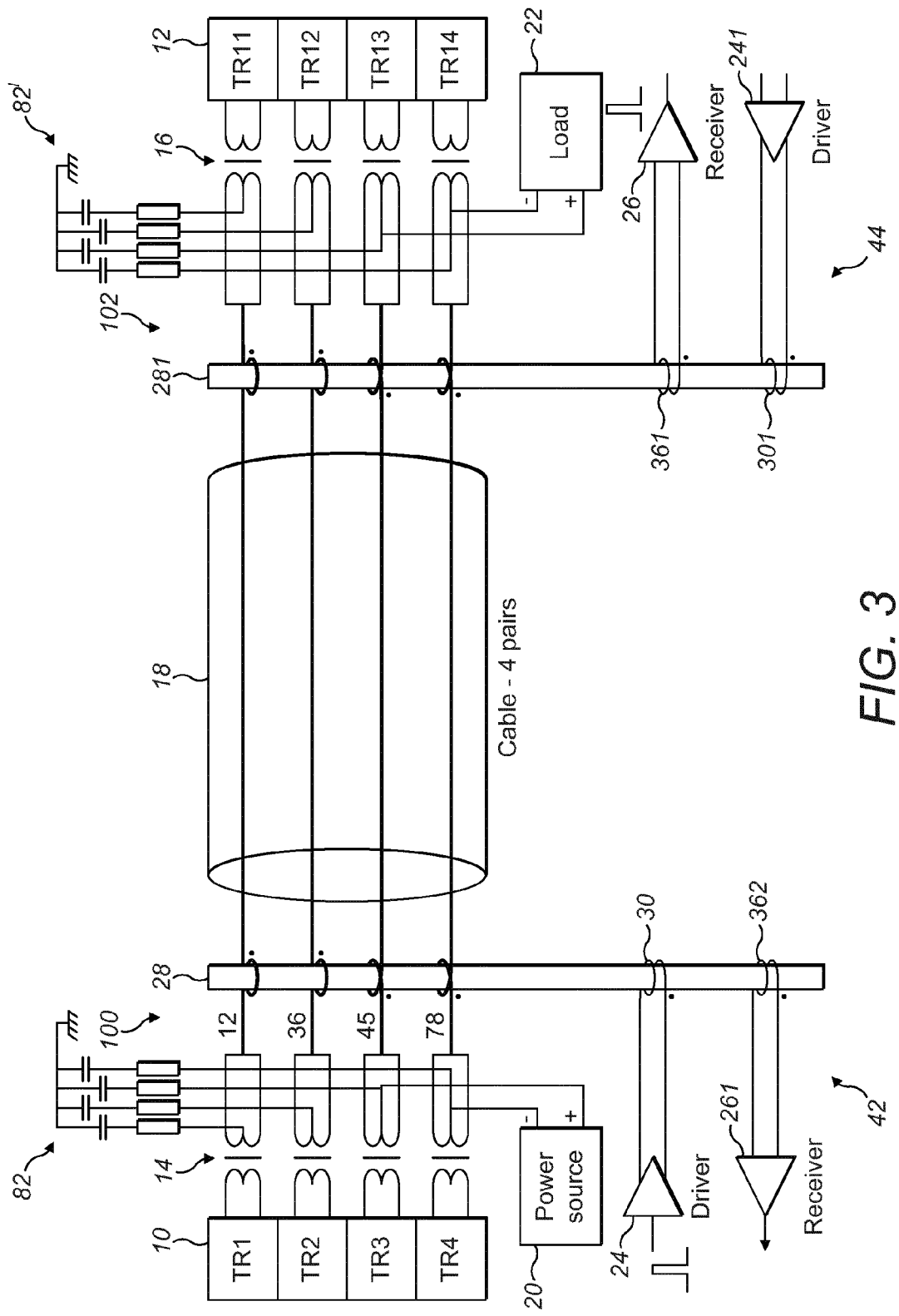
FIG. 3 is a schematic circuit diagram of another signalling system according to an embodiment of the present invention.

FIG. 3 Inductive Couplings at Both Ends for Both Sending and Receiving.

The signalling system of FIG. 3 shows another embodiment of the invention. It has an inductive coupling 100, 28, 30 coupling a sender 24 to four wire pairs as described above with reference to FIG. 2. The system of FIG. 3 uses an inductive coupling 102 in place of the capacitive coupling of FIG. 2 for coupling the receiver 26 to receive the synchronizing signal.

The inductive coupling 102 comprises a ferrite core 281 around which is wound the wires of the four wire pairs. Wire pairs {1,2} and {3,6} are wound with the same one polarity which is the same as the polarity of the windings of coupling 100 and wire pairs {4,5} and {7,8} are wound with the same opposite polarity.

A receive winding 361 is wound around the core for coupling the synchronizing signal to the receiver 26.

In addition coupling 102 has a sender 241 connected to a send winding 301 around the core 281 and the coupling 100 has a receiver 261 connected to a receiver winding 362 around the core 28. The sender 241 connected to the send winding 301 and the receiver 261 connected to the receiver winding 362 operate in exactly the same way as the sender 24, winding 30 and the receive winding 361 and receiver 26.

The windings 30 and 362 are shown as separate for case of explanation but in practice the sender 24 and receiver 261 may be both connected to a single winding. Likewise the receiver 26 and sender 241 may be connected to a single winding.

The use of the ferrite core 28 in FIGS. 2 and 3 allows the wire pairs to be wrapped around the core without access to the signal transformers 14 and the PHY 10. The use of the ferrite core 281 in FIG. 3 allows the wire pairs to be wrapped around the core without access to the signal transformers 16 and the PHY 12.

Figure 4:
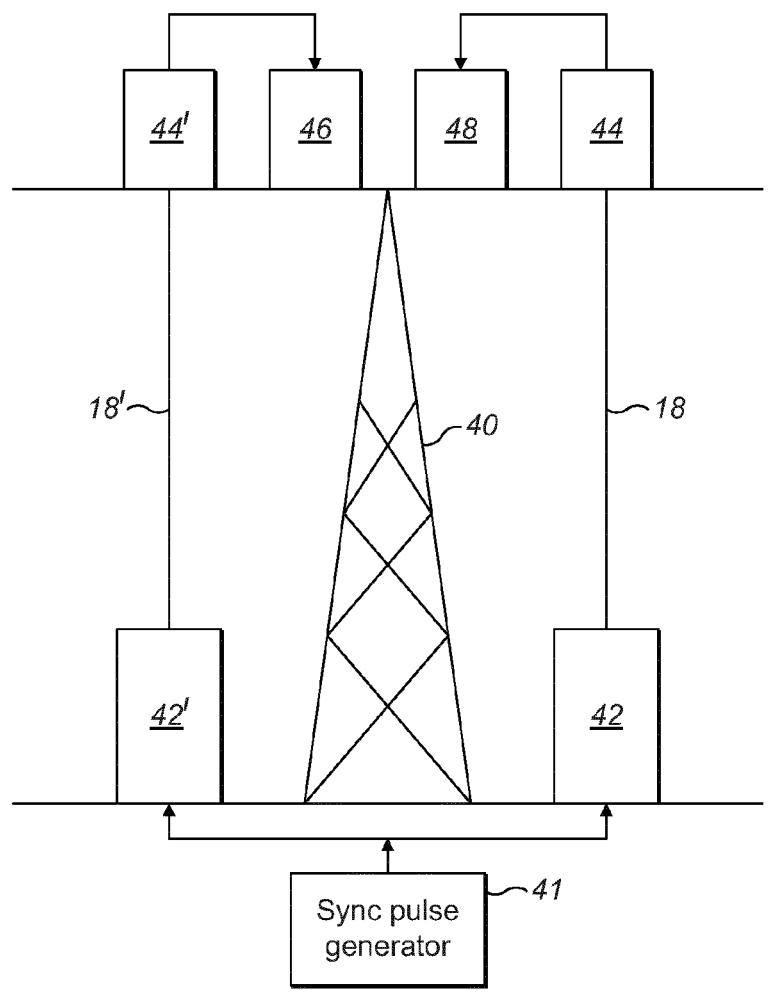
FIG. 4 is a schematic diagram of a communications mast incorporating the signalling system of FIG. 2 or 3.

FIG. 4 Communications Mast

The signalling system of FIG. 2 or 3 may be used to supply synchronising signals to radio equipment at the top of a communications mast. As shown by way of a simplified example in FIG. 4, a mast 40 supports two or more radio transceivers 46, 48 at the top of the mast. In a Time-Division-Multiplexed radio system the operation of each of the radios is preferably synchronised with the operation of the other(s). To reduce mutual interference, the radios preferably only transmit simultaneously in one time interval and only receive simultaneously in another time interval.

Such radio systems are commonly (but not exclusively) arranged such that there is a radio element at the top of a transmission mast or other structure, with a power supply at the bottom of the mast. For economy, data and power are carried on one common cable 18 between the power supply and the radio. In this example, two radio transceivers 46, 48 are coupled by two cables 18', 18 to respective power supply and signalling equipments at the bottom of the mast.

The system of FIG. 2 provides a means of adding a further signal to the same cable either when the mast and transceivers are first installed or after installation. The further signal can be used for synchronization or ancillary data. This therefore avoids the cost and complexity of installing an additional cable purely for such synchronization or ancillary data.

The system of FIG. 2 can be applied to an existing installation at the bottom of the mast 40, without the need to replace the cable or the power supply, and without interrupting the signals carried on the cable. There is no direct contact with the cable conductors, and insulation/isolation is maintained at the bottom of the mast. The system of FIG. 2 as applied to the mast assumes that the coupling of the wire pairs to the transformer 36 and receiver 26 at the top of the mast is present at installation of the mast and does not need to be provided later.

In FIG. 4, each radio transceiver 46, 48 at the top of the mast 40 is connected to a corresponding receiver 44', 44 and each receiver 44, 44' is connected by a cable 18, 18' to a corresponding sender 42, 42' at the bottom of the mast. The senders 42, 42' are commonly connected to a synchronizing generator 41.

It is preferred to use the inductive coupling 28, 30 of FIG. 2 at the bottom of the mast so that there is no need for direct connection to the cable. Also it avoids connection to the transformer 14 used to couple Ethernet data to each wire pair; the transformer 14 may not be accessible.

It is preferred to use capacitive coupling at the top of the mast. The inductors 32, capacitors 34 and signal transformers 16, 36 are small, cheap and readily handled by automatic assembly equipment.

Whilst the previous text has discussed a means of communicating a synchronizing pulse "up the mast", it is recognized that in some installations the synchronizing timing reference may in fact be provided from one of the radios concerned. In such a case, there is additionally the need to communicate a synchronizing pulse "down the mast" from the reference radio to the power source (or ancillary equipment) at the bottom of the mast, and thence "up the mast" to one or a plurality of further radios. The system described can be operated in reverse such that a synchronizing pulse is driven at the radio end 44 and received at the power source equipment end 42. This does not incur any significant extra cost, because the driver and receiver elements are commonly available as bi-directional parts incorporating both a driver and a receiver in the same integrated circuit package. For example one of the transceivers may provide the synchronizing pulses which are transmitted down the mast and back up to the other transceiver(s).

Whilst the mast of FIG. 4 has signalling systems for each of the radio transceivers, only one signalling system may be provided for coupling a synchronizing signal (or data signal) to all the radio transceivers.

Whilst this description has referred to a "synchronizing pulse", it will be readily appreciated that other data may be transmitted in the same manner and might be used for other control purposes. Such data may likewise be transmitted in one direction, or in both directions. Indeed, data may be transmitted in both directions simultaneously, using cancellation or "Hybrid" techniques commonly used in the industry.

The signalling systems of FIGS. 2 and 3 have the following benefits.

The interface, 44 in FIG. 2, at the radio transceiver end (top of the mast) has a small number of cheap parts (the capacitors 34, inductors 32 signal transformer 36 and receiver 26) that can be included in all radio transceivers without an unduly high cost burden. If synchronization or additional data signalling is then required after the initial installation, the synchronizing pulse driver or signal source and coupling 28, 30 may be added at the bottom of the mast without requiring a worker to climb the mast or without requiring a replacement or modification of the radio transceiver(s) 46, 48. There is then no interruption of existing services on the cable. The power and Ethernet data carried on the cable pairs are not interrupted, so signal integrity is not compromised. There is no direct connection to the cable conductors, and the inductive coupling preserves the electrical isolation on the cable.

Examples of Inductive Couplers 28, 30

Cabling systems for Ethernet data commonly include short lengths of cable terminated at each end with connectors, known as patch leads. The cable and connectors have been extensively developed to ensure good signal integrity for the Ethernet data. The cable sheath may be removed from a short section of such a patch lead to expose the insulated wire pairs within. These wire pairs may then be coiled on a former within a ferrite core such as an "RM10" type core, together with an additional winding to couple to the synchronizing pulse driver. No cutting of or direct connection to the wire pairs is required, and thus there is no (or very little) disturbance to the established signal integrity.

Two connectors at opposite ends of a section of printed circuit board may be interconnected with track on the board around a central hole. A further track is coupled to the synchronizing pulse driver. A ferrite core set may then be clamped around that part of the printed circuit board to realise what is commonly known as a planar transformer.

This assembly is then connected in series with the 4-pair cable. Techniques exist to ensure that the characteristics of the wire pairs of the cable are replicated on the printed circuit board such that signal integrity is maintained. Conveniently, the same printed circuit board may also hold the synchronizing pulse driver 24 and the receiver 261 (if provided) and associated circuits.

As mentioned above, such inductive couplings may be used at both ends of the signalling system instead of using the capacitors 34, inductors 32, and signal transformer 36 at the top end. In an embodiment having an inductive coupler at the top, or receiver, end, the printed circuit board of the planar transformer may include the receiver 26.

Figure 5:
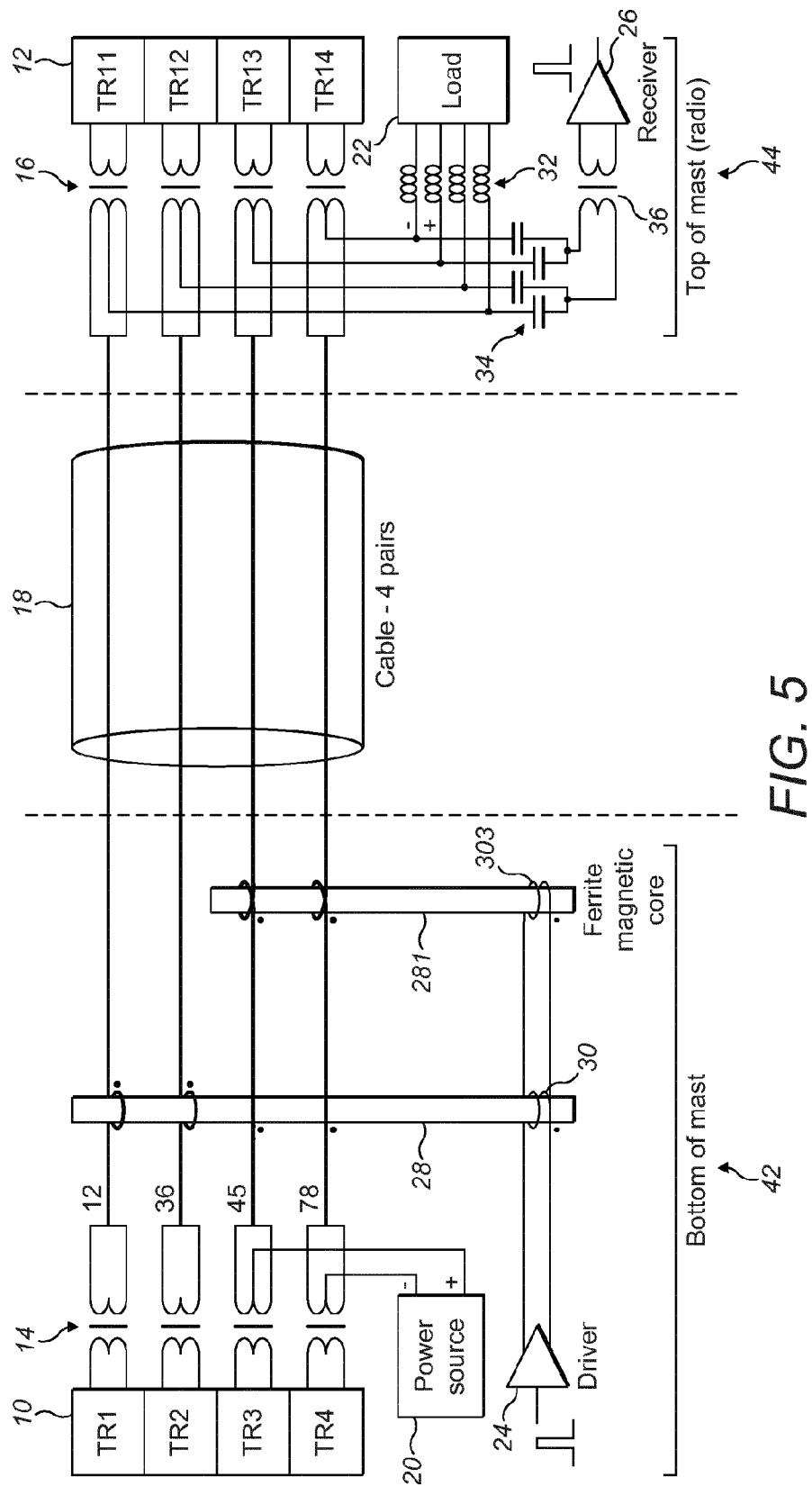
FIG. 5 is a schematic circuit diagram of a modification of the signalling system of FIG. 2.

FIG. 5 Alternative Core Arrangement.

FIG. 5 shows a modification of the example of FIG. 2, in which the single magnetic core 28 is replaced by two cores 28 and 281. The core 28 is coupled to the wire pairs {1,2} and {3,6} and core 281 is coupled to wire pairs {4,5} and {7,8}. The signal source or drive 24 is coupled to the cores 28 and 281 by respective windings 30 and 303 which are connected in series or in parallel.

One or both inductive couplings of FIG. 3 may be modified in similar manner.

Termination

It will be appreciated that in the systems of FIGS. 2, 3 and 5 a current path is required between wire pairs {1,2} {3,6} and {4,5} {7,8} on the PHY 10 side of the synchronising pulse coupler. This is commonly provided by pre-existing terminating networks attached to the Ethernet transformer 14. Such a termination is also present at the PHY 12 end of the signalling system with pre-existing terminating networks attached to the Ethernet transformer 16. One suitable termination is known as a Bob Smith termination shown by way of example at 82 and 82' in FIG. 3. It has also been found that the capacitance between cable pairs in a length of cable can provide sufficient termination.

Variants

The above embodiments are to be understood as illustrative examples of the invention. Further embodiments of the invention are envisaged. For example:—

The system described above uses 4 wire pairs, but the invention may be applied to signalling systems with only two wire pairs, one pair being used for data signalling and the further signal and the other wire pair providing the return path. The further signal on the any path carrying the Ethernet data is a common-mode signal. The further signal on any other path (e.g. the return path) may not be a common-mode signal.

An Ethernet 100BaseT system may use only two wire pairs. In such a system wire pairs corresponding to pairs {1,2} and {4,5} of FIG. 2 would be used. Those wire pairs would be pairs {1,2} and {3,6} omitting wire pairs {4,5} and {7,8}. Referring to FIG. 2 for example, wire pair {3,6} would be wound around core 30 in the opposite direction to that shown and would thus correspond to wire pair {4,5}. In 100BaseT (2-pair) Ethernet systems, it is usual to use one pair for each direction of Ethernet, so there is a signal source and a signal receiver at each end of the cable.

The system as described injects a signal in common mode between the wire pairs {1,2,3,6} and the wire pairs {4,5,7,8}; that is, when {1,2,3,6} are negative, {4,5,7,8} are positive and vice versa. This provides good rejection of supply noise from IEEE 802.3at type power sources, since they supply on {4,5} and return on {7,8}, or supply on {3,6} and return on {1,2}. However, proprietary systems may use different wires. For example, Cambium Networks' PIDU supplies power on wires {4,5,7,8} with return on {1,2,3,6}, so power supply noise will not be self-cancelled with the winding polarities shown in FIG. 2 and extra care must be taken with signal-to-noise ratios. The principle, spirit and application of the present invention may still be used, as it is only necessary to use different winding directions on the inductive coupling transformer at the driving end and a corresponding change to the connections at the receiver end, to better accommodate such systems.

Whilst the examples above use an inductive coupler 28, 30 at the sending equipment 42, the coupler may be provided at any point on the cable 18 between the sending equipment 42 and the receiving equipment 44.

The DC power source is shown in FIGS. 2, and 3 coupled to wire pairs via centre taps of transformer 14, but there are other known ways of applying power to the wires. One example is shown in FIG. 1 in which dashed box 200 comprises a power source 20 coupled to centre taps of windings W1 and W2 connected in parallel to the windings of the signal transformers 14 and isolated by DC blocking capacitors C1 to C4. DC power may be applied to any or all the wire pairs as indicated by box 200 extending across all wire pairs. One wire (of any wire pair) may be connected to a positive terminal of a power supply and another wire (not necessarily of the same pair) may be connected to a negative terminal. Alternatively one wire pair may be connected to a positive terminal of a power supply and wires in one or more other pairs may be connected to a negative terminal. The load 22 may be coupled in exactly the same way.

The examples above use a ferrite core 28, because ferrite is suitable for high frequency signals. However other suitable core materials may be used.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A signaling system comprising:
a first data signal source and a first data signal receiver;
at least two wire pairs, wherein one of the at least two wire pairs couples the first data signal source to the first data signal receiver;
a magnetic core arrangement around which a portion of each wire of the at least two wire pairs is wound;
a further signal source;
a further winding, coupled to the further signal source, the further winding wound around the magnetic core arrangement, and electrically isolated from each wire of the at least two wire pairs;
wherein the further winding is arranged so the further signal in each of the at least two wire pairs is a common-mode signal; and
a further receiver coupled to receive the further signal by a coupling arrangement which is coupled to a first of the at least two wire pairs to receive the further signal and coupled to the second of the at least two wire pairs to provide a return path for current induced in the first of the at least two wire pairs by the further winding.

2. A signaling system according to claim 1, wherein the magnetic core arrangement comprises a magnetic core around which a portion of each wire of the at least two wire pairs is wound, and wherein the further signal source is coupled to the magnetic core by the further winding.

3. A system according to claim 2, further comprising a DC power supply coupled to one of the at least two wire pairs.

4. A system according to claim 2, wherein the coupling arrangement comprises a capacitive coupling coupled to the further receiver and to the return path.

5. A system according to claim 2, wherein the coupling arrangement comprises a further magnetic core around which a portion of each wire is wound and another winding, coupled to the further receiver, around the core coupling the further receiver to the at least two wire pairs to receive the further signal.

6. A system according to claim 2, wherein the first data signal source and the first data signal receiver are of an Ethernet signaling system and the at least two wire pairs are of an Ethernet cable.

7. A system according to claim 2, wherein the first of the at least two wire pairs is wound around the magnetic core with one polarity and the second of the at least two wire pairs is wound around the further magnetic core with an opposite polarity.

8. A system according to claim 2, wherein the first data signal source and the first data signal receiver are of an Ethernet signaling system and the at least two wire pairs are of an Ethernet cable in which there are two wire pairs, wherein one of the at least two wire pairs is coupled to the first data signal source and to the first data signal receiver by respective first signal transformers and a portion of each the wires of the at least two wire pairs is wound around the magnetic core.

9. A system according to claim 8, wherein one of the wire pairs is wound around the magnetic core with one polarity and the second of the at least two wire pairs is wound around the further magnetic core with an opposite polarity.

10. A system according to claim 2, wherein the first data signal source and the first data signal receiver are of an Ethernet signaling system and the at least two wire pairs are of an Ethernet cable having four wire pairs, wherein two of the wire pairs are coupled to respective data signal sources by first signal transformers and to data signal receivers by further signal transformers, and wherein a portion of each of the at least two wire pairs is wound around the magnetic core.

11. A system according to claim 10, wherein the at least two of the wire pairs are wound around the magnetic core with one polarity and the second of the at least two wire pairs is wound around the further magnetic core with an opposite polarity.

12. A system according to claim 10, wherein the coupling arrangement comprises a capacitive coupling coupled to the further receiver and to the return path, wherein the capacitive coupling arrangement that couples the center taps of the further signal transformers to the further receiver also couples the further signal to the further receiver.

13. A system according to claim 12 further comprising a signal transformer that couples the capacitive coupling arrangement to the further receiver.

14. A system according to claim 2, wherein the first data signal source is of a first transceiver and the first data signal receiver is of a second transceiver, wherein the first and second transceivers are coupled by respective wire pairs for bidirectional communication.

15. A system according to claim 2, wherein the further signal source and the further receiver are of transceivers providing bidirectional communication of further signals.

16. A system according to claim 1, wherein the magnetic core arrangement comprises a first core and a second core, wherein a portion of one pair of wires is wound around the first core and a portion of another pair of wires is wound around the second core, and wherein the further signal source is coupled to the first and second cores by respective further windings wound round the first and second cores, and wherein the further windings are electrically isolated from the pairs of wires.

17. A system according to claim 16, comprising two further pairs of wires, a portion of one of the further pair of wires being wound around the first core and a portion of another of the further pair of wires being wound around the second core.

18. A communications system comprising a communications mast supporting radio equipment at the top of the mast; a power supply equipment at the bottom of the mast; and a signaling system according to claim 2, wherein the said first and further signal sources are at the bottom of the mast and the first and further signal receivers are at the top of the mast, wherein the mast supplies the first and further signals to the radio equipment.

19. A communications system according to claim 18 wherein the radio equipment comprises radios are arranged to transmit and receive in Time Division Multiplex manner and the further signal source is arranged to provide a synchronizing signal for the radios.

20. A method of modifying a signaling system comprising a first data signal source and a first data signal receiver and at least two wire pairs, one of the at least two wire pairs coupling the first data signal source to the first data signal receiver, the method comprising:
providing a magnetic core arrangement;
winding a portion of each wire of the at least two wire pairs around the magnetic core arrangement;
providing one or more further windings around the magnetic core arrangement; and
providing a further signal source coupled to the one or more further windings, wherein the one or more further windings and the wires of the at least two wire pairs are electrically isolated from each other, and
wherein the windings are arranged so the further signal source generates a common mode signal in each of the at least two wire pairs, and wherein the signaling system further comprises a second data signal receiver coupled to receive the common mode signal by a coupling arrangement which is coupled to one of the at least two wire pairs and coupled to the other of the at least two wire pairs to provide a return path for current induced in the at least two wire pairs by the one or more further windings.

21. A method according to claim 20, wherein the magnetic core arrangement comprises a magnetic core around which a portion of each wire of the at least two wire pairs is wound, and wherein the further signal source is coupled to the magnetic core by the one or more further windings.

* * * * *